Nov. 2, 1937.  W. FERRIS ET AL  2,097,857
HYDRAULIC TRANSMISSION
Filed May 26, 1933   7 Sheets-Sheet 1
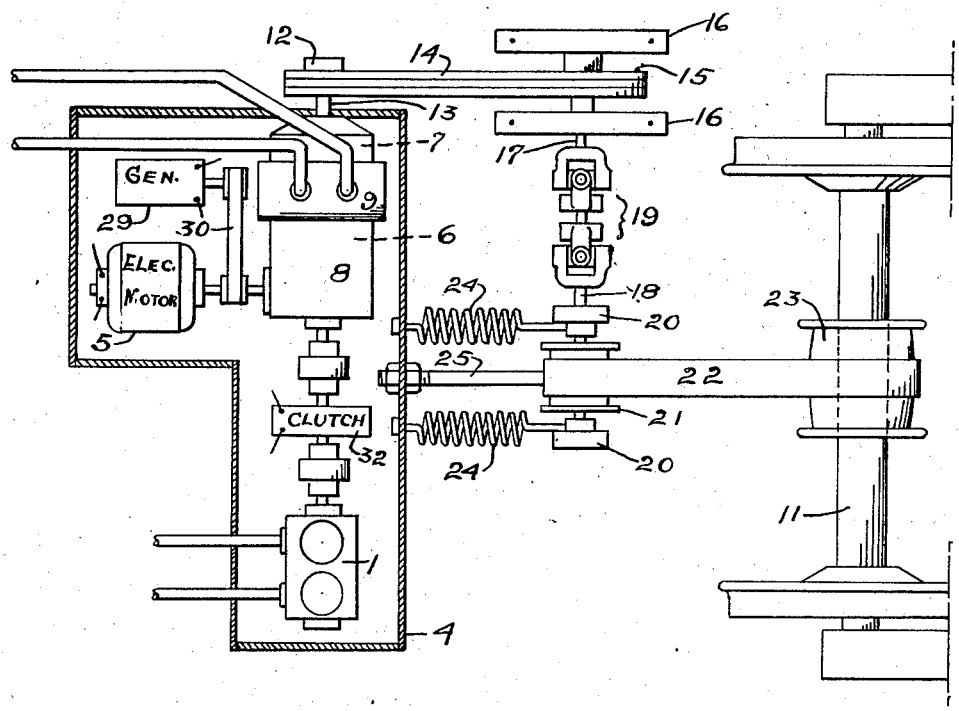
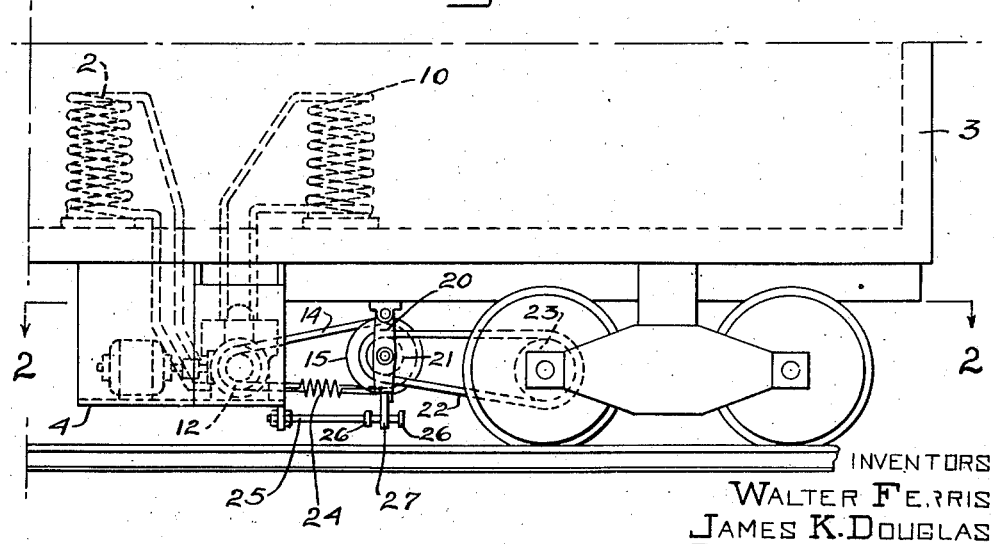
INVENTORS
WALTER FERRIS
JAMES K. DOUGLAS
GEORGE H. FOBIAN
BY *Wesley Merrill*
ATTORNEY.

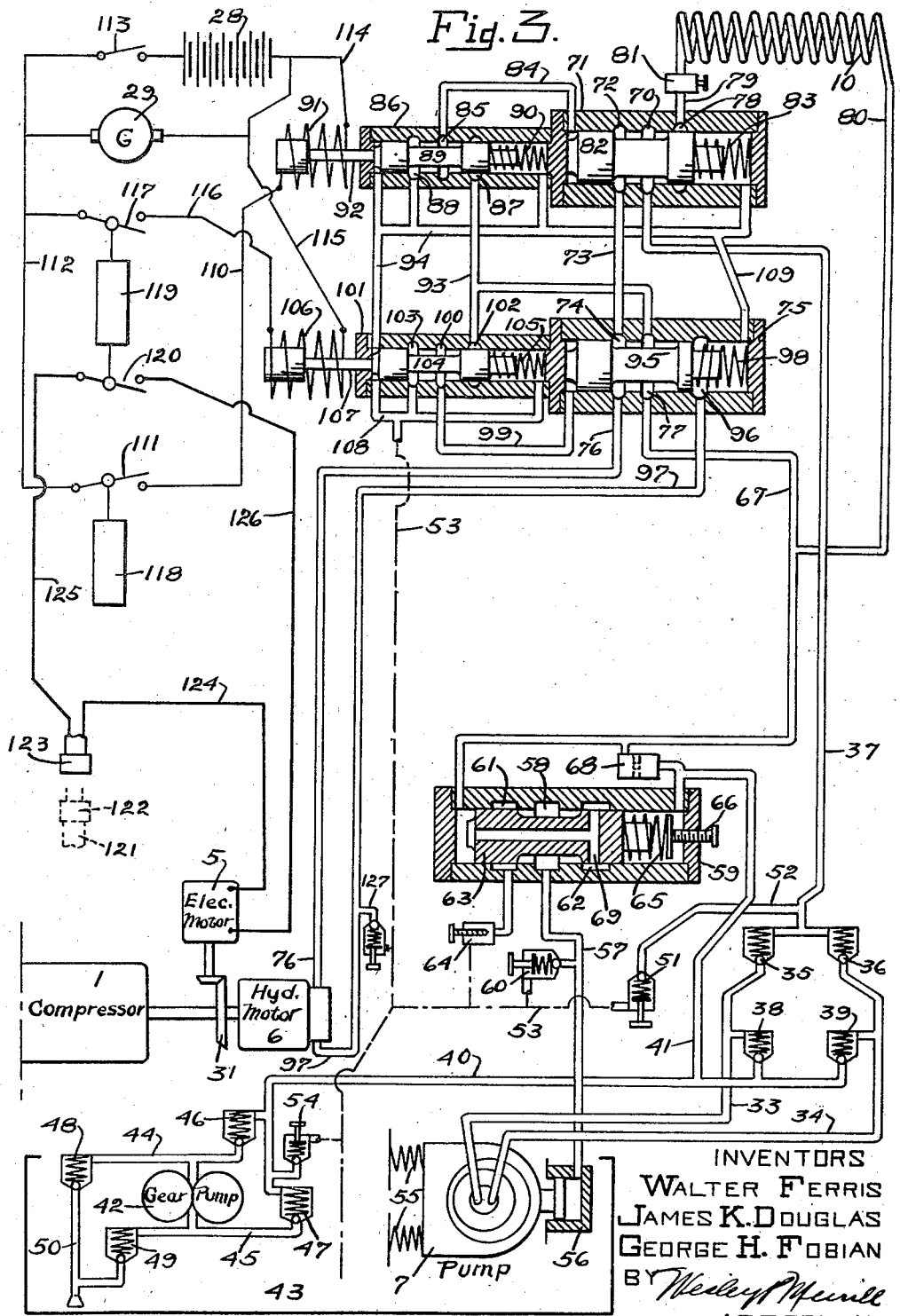

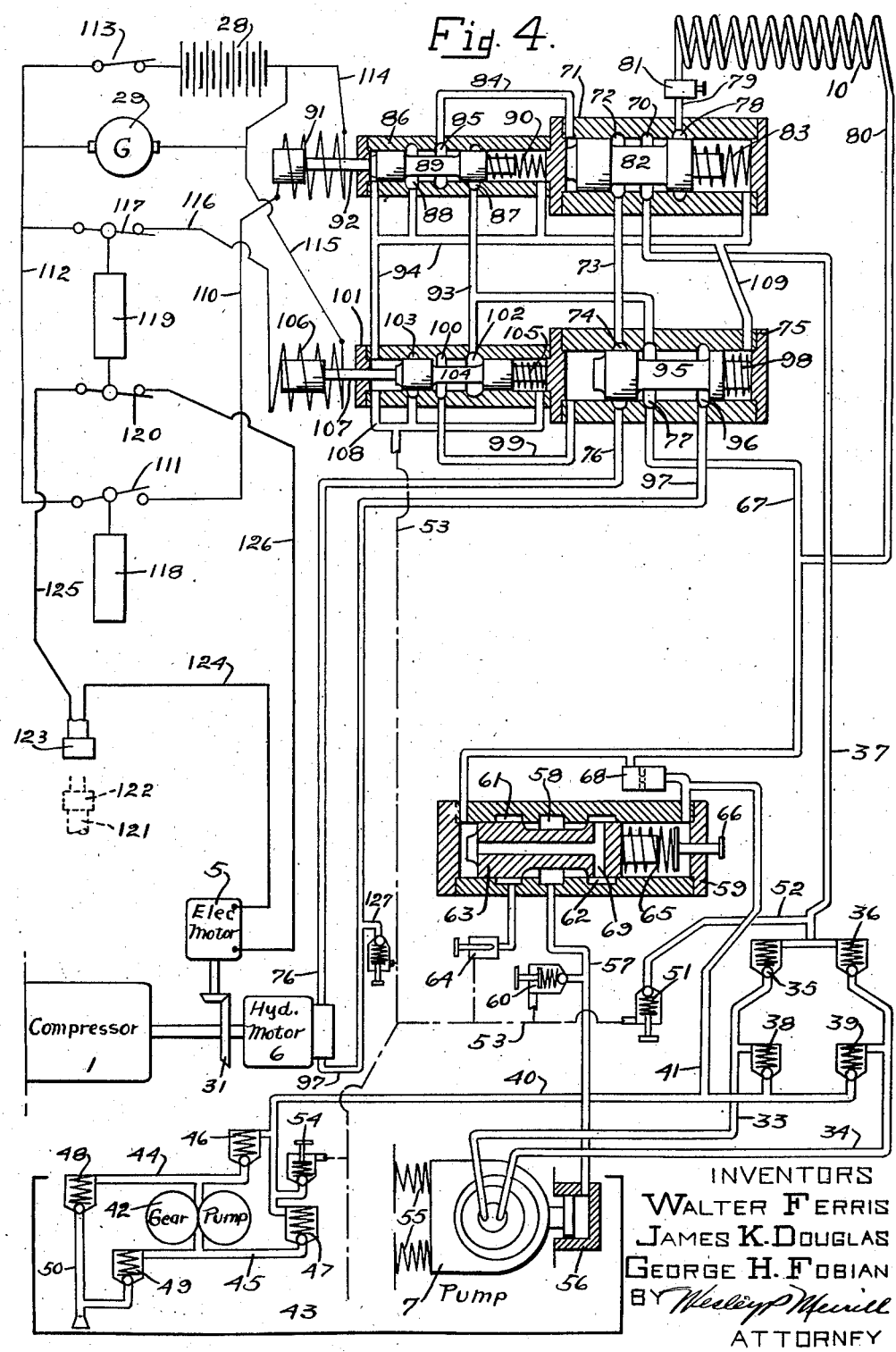

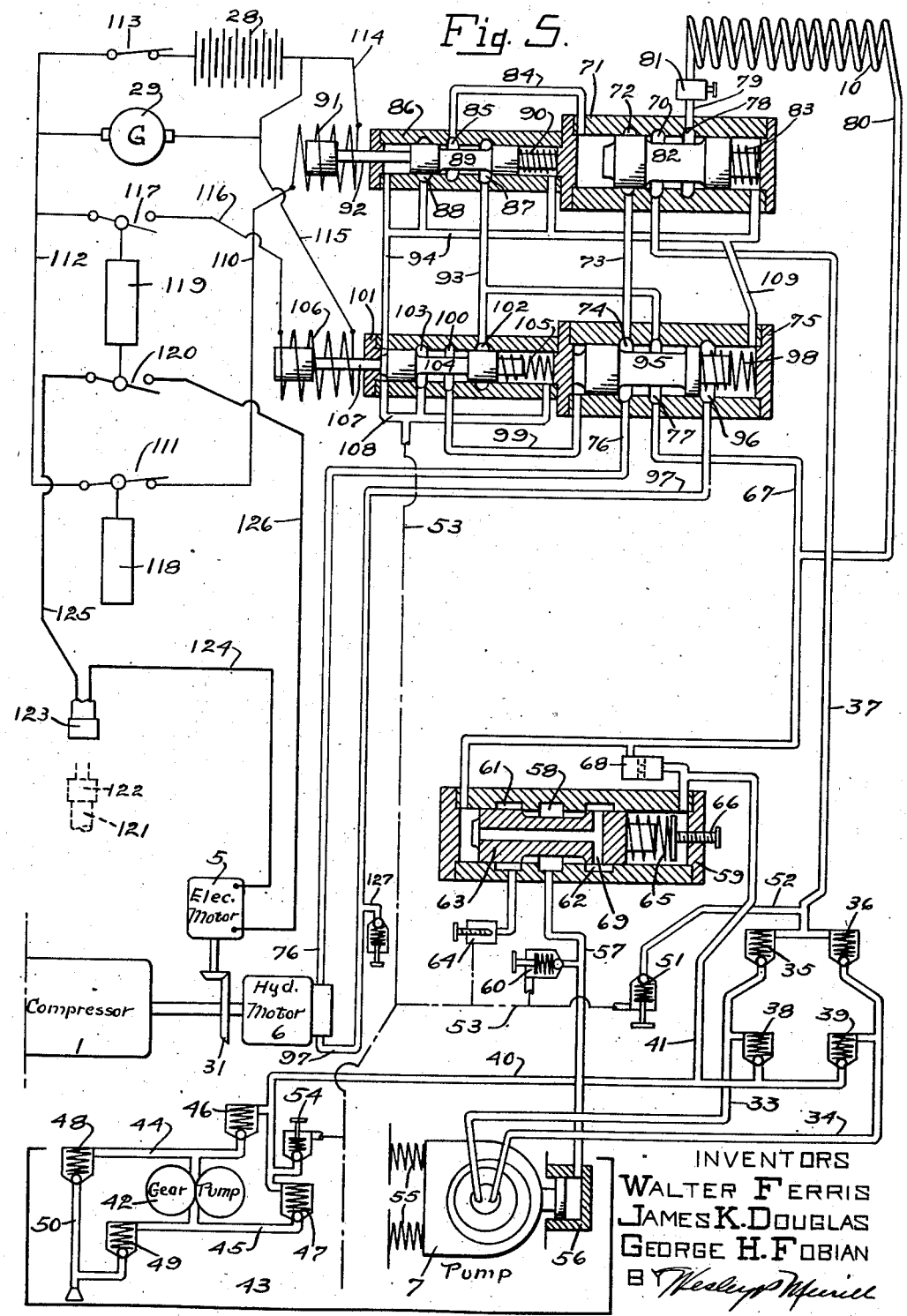

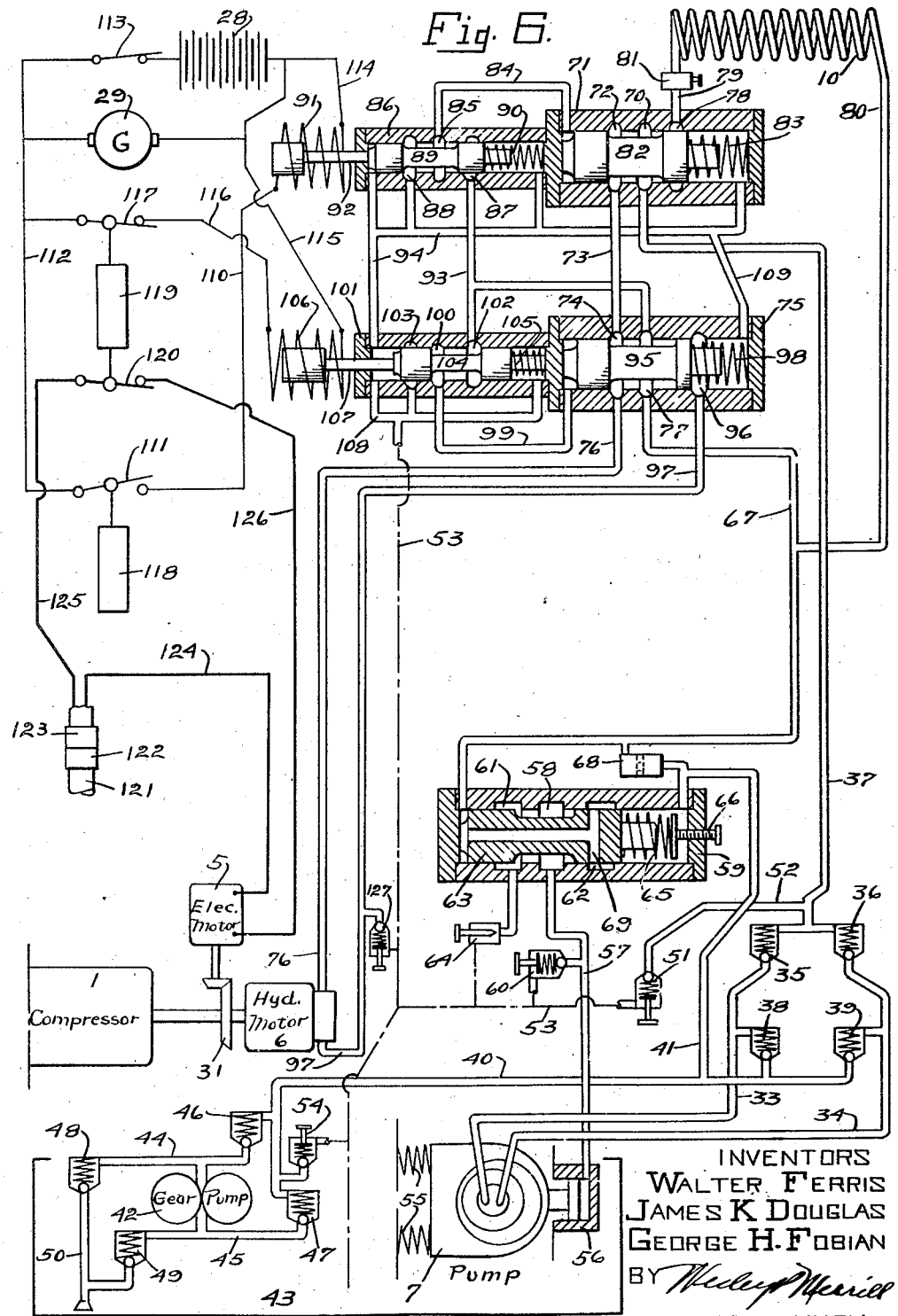

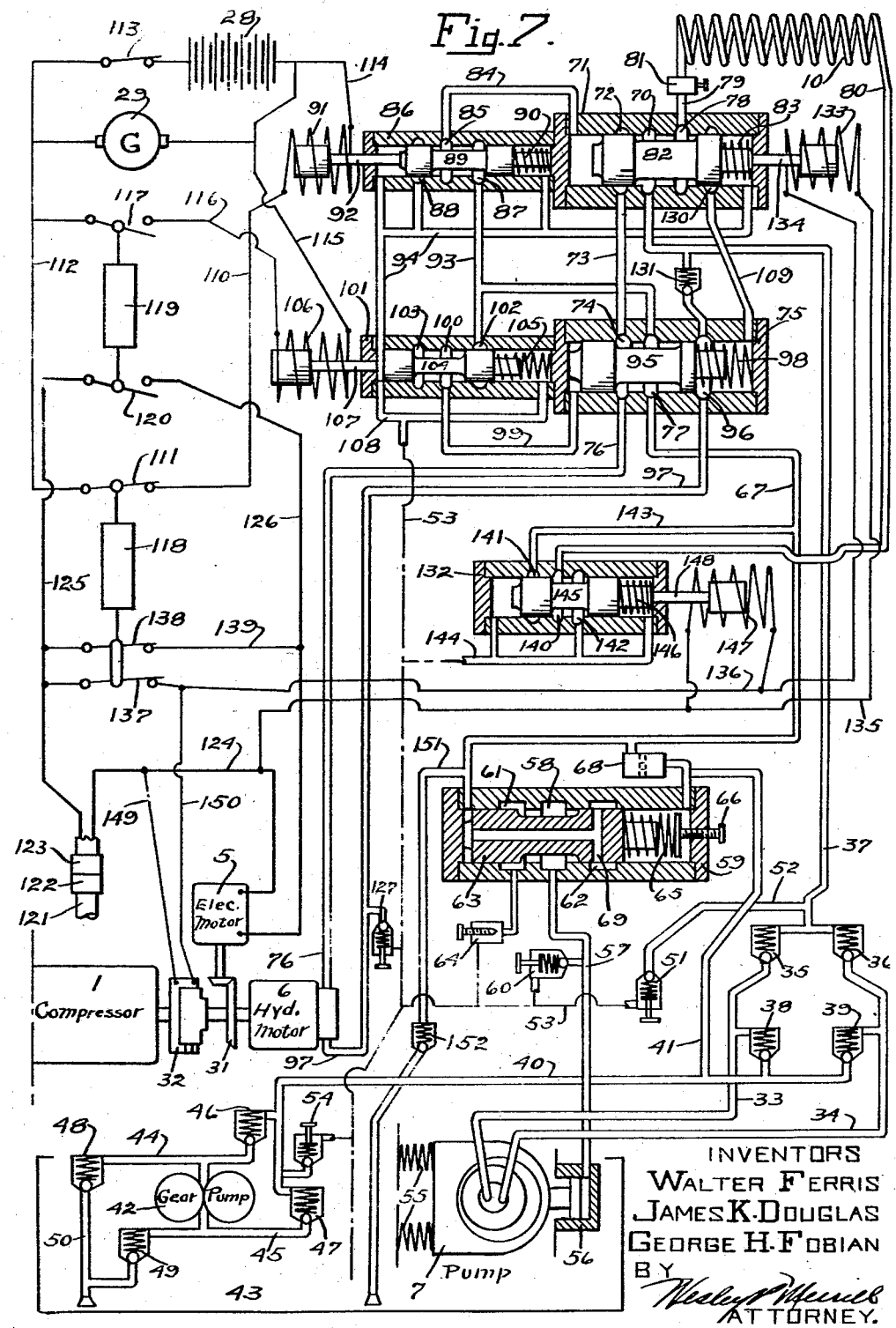

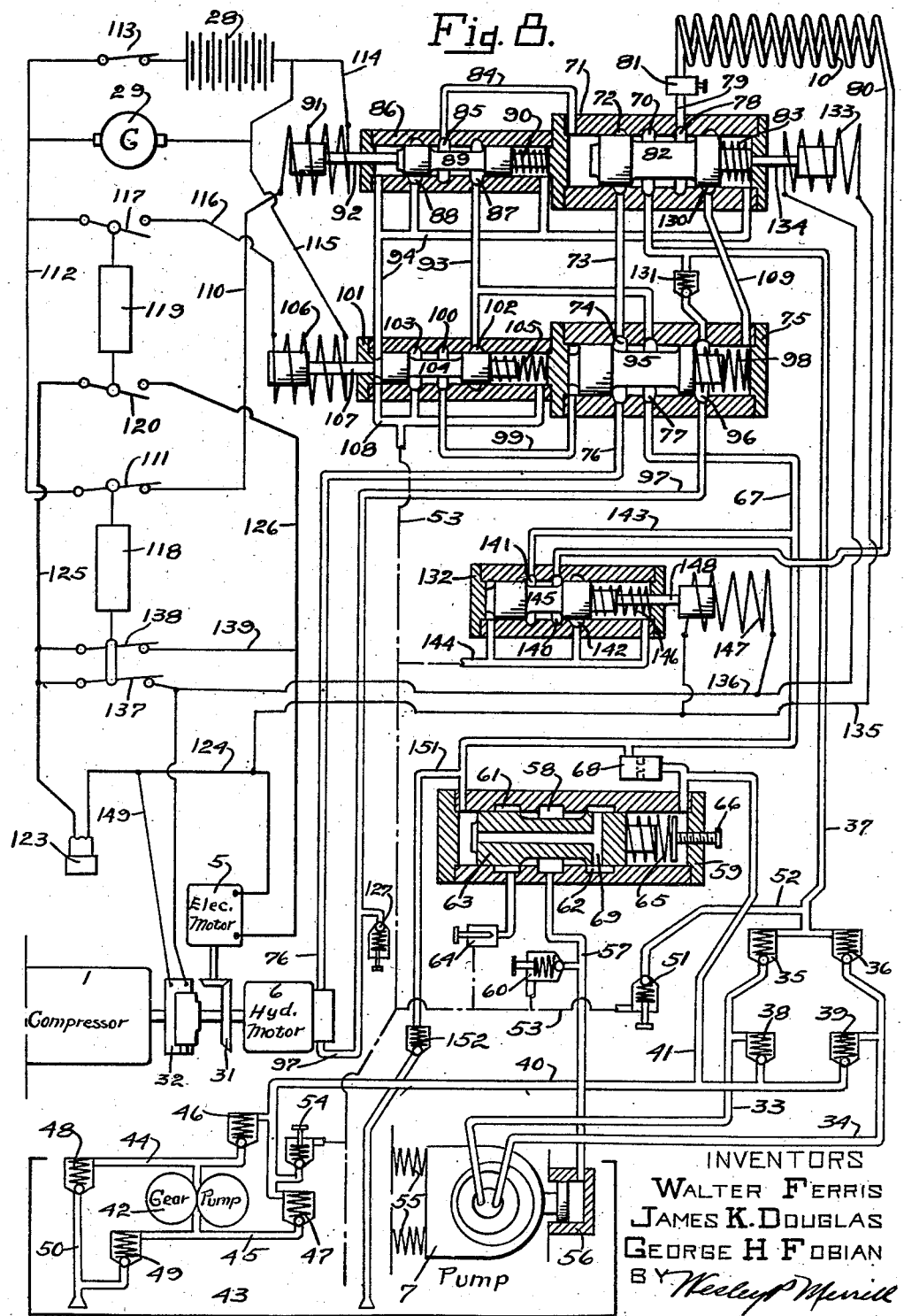

Patented Nov. 2, 1937

2,097,857

UNITED STATES PATENT OFFICE 2,097,857

HYDRAULIC TRANSMISSION

Walter Ferris and James K. Douglas, Milwaukee, and George H. Fobian, West Allis, Wis., assignors to The Oilgear Company, Milwaukee, Wis., a corporation of Wisconsin Application May 26, 1933, Serial No. 673,018

14 Claims. (Cl. 257—7)

This invention relates to a hydraulic transmission which is particularly adapted for driving the refrigerating apparatus employed to cool the interior of a vehicle, such as a refrigerator car or a railway passenger car.

The power for driving the refrigerating apparatus of a railway car is derived from the car wheels which rotate at widely varying speeds depending upon the speed at which the car is traveling, but the refrigerating machinery should be driven at a substantially constant speed or at speeds which vary through a very narrow range.

A refrigerator car may remain on a side track or in a railway yard during a time when its interior should be either cooled or heated to provide comfort for the occupants of a passenger car or to preserve the contents of a refrigerator car.

The present invention has as an object to provide a hydraulic transmission which will drive the refrigerating apparatus of a vehicle at a substantially constant speed within a wide range of vehicle speeds.

Another object is to provide a hydraulic transmission which will drive the refrigerating apparatus of a vehicle in a given direction irrespective of the direction of vehicle movement.

Another object is to provide a hydraulic transmission which will either generate heat to heat a vehicle or drive a refrigerating apparatus to cool the vehicle.

Another object is to translate power derived either from the wheels of the moving vehicle or from a stationary electric circuit into energy for heating the vehicle or for driving the refrigerating apparatus thereof.

Another object is to provide a hydraulic transmission of this character which is highly efficient in operation.

Another object is to provide the refrigerating apparatus of a vehicle with a drive which is economical to manufacture relative to other drives.

A transmission constructed in accordance with the present invention has the advantage of being fully automatic in operation and susceptible of close adjustment and control.

Other objects and advantages will appear from the description hereinafter given of a transmission in which the invention is embodied.

According to the invention in a general aspect and as ordinarily embodied in practice, the transmission is provided with a hydraulic motor for driving the refrigerating apparatus of a vehicle, a pump which is driven from the wheels of the vehicle at speeds varying in accordance with the vehicle speed, means for directing liquid from the pump to the motor to drive the same, and means for varying the relative displacements of the pump and the motor in accordance with variations in vehicle speed to thereby enable the motor to drive the refrigerating apparatus at a substantially constant speed during a wide variation in the speed of the vehicle.

According to the invention in another aspect, means are provided for directing liquid from the pump to the motor to drive the same in a given direction irrespective of the direction of pump actuation.

According to the invention in another aspect, an electric motor provides the motive power when the vehicle is stationary.

The invention is exemplified by the transmission shown schematically in the accompanying drawings in which the views are as follows:

Fig. 1 is a side view of a part of a railway refrigerator car to which the invention has been applied.

Fig. 2 is a plan view taken on the line 2—2 of Fig. 1.

Fig. 3 is a schematic drawing of the hydraulic and electric circuits employed in one embodiment of the invention and shows the various parts thereof in the positions occupied when the car is in motion and the temperature of the car is not being corrected.

Fig. 4 is a view similar to Fig. 3 but showing the parts in the positions occupied when the car is in motion and the interior thereof is being cooled.

Fig. 5 is a view similar to Fig. 3 but showing the parts in the positions occupied when the car is in motion and the interior thereof is being heated.

Fig. 6 is a view similar to Fig. 3 but showing the parts in the positions occupied when the car is stationary and the interior thereof is being cooled.

Fig. 7 is a schematic drawing of a modification of the apparatus shown in Fig. 3 and shows the parts in the positions occupied when the car is stationary and the interior thereof is being heated.

Fig. 8 is a view similar to Fig. 7 but showing the parts in the positions occupied when the car is in motion and the interior thereof is being heated.

Figures 1 and 2.

The car is provided with refrigerating apparatus of which only a compressor 1 and a cooling coil 2 are shown for the reason that such apparatus is well known and of itself forms no part of the present invention.

The coil 2 is arranged within the body 3 of the car, and the compressor 1 is arranged within a closed housing 4 which is carried by the body 3 upon the underside thereof and encloses parts of the refrigerating apparatus and the hydraulic transmission to protect the same from dust and dirt.

When the car is stationary, the compressor 1 may be driven by an electric motor 5 and, when the car is in motion, it may be driven by a hydraulic motor 6 (Figs. 3–8) which is driven by liquid supplied thereto from a variable displacement pump 7 (Figs. 3–8).

The hydraulic motor 6 and the pump 7 are shown separated in Figs. 3 to 8 but, in practice, they are arranged within a single transmission casing 8 which is enclosed by the housing 4 and has a valve casing 9 attached thereto as shown in Fig. 2.

The valve casing 9 contains certain valves which are shown schematically in Figs. 3 to 8 and which control the flow of liquid from the pump 7 to the motor 6 and from the pump 7 or the motor 6 to a heating coil 10 which is arranged within the car body 3.

When the car is moved in either direction, the pump 7 is driven from the car axle 11 through a flexible drive which automatically compensates for variations in the relative positions in the pump 7 and the axle 11.

As shown, the pump 7 has a pulley 12 fixed upon the outer end of its drive shaft 13 and connected by a texrope drive 14 to a pulley 15 which is arranged between two stationary bearings 16 fixed to the car body upon the underside thereof.

The pulley 15 is fixed upon a countershaft 17 which is journaled in the lower ends of the bearings 16 and connected to a swinging shaft 18 by a universal joint 19.

The swinging shaft 18 is journaled in the lower ends of two pivoted bearings 20 and has a pulley 21 fixed thereon between the bearings 20 and connected by a belt 22 to a pulley 23 which is arranged upon the axle 11 and fixed for rotation therewith.

Each bearing 20 is pivoted at its upper end to the underside of the car body and has its lower end urged by a spring 24 toward the housing 4 to keep the belt 22 tight.

Movement of the bearings 20 in either direction is limited by a stop rod 25 which has one of its ends attached to the housing 4 and its other end provided with two stops 26 arranged upon either side of a yoke 27 which connects the lower ends of the bearings 20 to each other.

The pump 7 is thus positively driven whenever the car is in motion, and it will deliver liquid to the hydraulic motor 6 or to the heating coil 10 or its output will be bypassed depending upon the positions of the several valves, as will be presently explained. The valves are automatically controlled in the usual manner by electric thermostats which are supplied with electric energy from a storage battery 28 (Figs. 3–8).

The battery 28 is kept charged by a generator 29 arranged within the housing 4 and connected by a belt 30 to the electric motor 5 which is connected by gearing 31 (Figs. 3–8) to the hydraulic motor 6. Consequently, the generator is driven whenever the electric motor 5 is being operated by current supplied from an external stationary circuit, or whenever the hydraulic motor 6 is being driven by the pump 7 at which time the electric motor 5 spins idly and functions as a flywheel.

If it is desired that the apparatus be capable of heating the car when it is stationary, a magnetic clutch 32 is connected between the compressor 1 and the gearing 31 but, if standby heating is not desired, the clutch 32 is omitted.

Figures 3–6.

The aparatus shown schematically in these figures is adapted to either cool or heat the car when the pump 7 is being driven from the axle 11 or to cool the car when the electric motor 5 is energized by current from an external stationary circuit.

When the pump 7 is being driven, it discharges liquid into either a channel 33 or a channel 34 and receives liquid through either the channel 33 or the channel 34, depending upon the direction the car is moving and, consequently, the direction in which the pump is being driven.

The channels 33 and 34 communicate, respectively, through two check valves 35 and 36 with a discharge channel 37 and through two check valves 38 and 39 with an intake pipe 40 which has one end of a return pipe 41 connected thereto intermediate the ends thereof.

The check valves 35 and 36 permit liquid to flow from the channel 33 or the channel 34 into the discharge channel 37 but prevent it from flowing in the opposite direction, and the check valves 38 and 39 permit liquid to flow from the intake channel 40 into either the channel 33 or the channel 34 but prevent it from flowing in the opposite direction.

When the pump 7 is driven in one direction, it delivers liquid to an external circuit through the channel 33, the check valve 35 and the discharge channel 37, and the check valves 36 and 38 prevent the liquid from entering the channels 34 or 40. Liquid is returned from the circuit to the pump through the return channel 41, the intake channel 40, the check valve 39 and the channel 34.

When the pump is driven in the opposite direction, it delivers liquid to an external circuit through the channel 34, the check valve 36 and the discharge channel 37, and the check valves 35 and 39 prevent the liquid from entering the channels 33 and 40. Liquid is returned from the circuit to the pump through the return channel 41, the intake channel 40, the check valve 38 and the channel 33.

The return side of the hydraulic circuit is kept flooded with liquid under a low pressure by a gear pump 42 which is driven in unison with the variable delivery pump 7.

The gear pump 42 draws liquid from a reservoir 43 through a channel 44 or a channel 45 and delivers it into either the channel 45 or the channel 44, depending upon the direction of pump actuation.

The channels 44 and 45 are connected, respectively, through two check valves 46 and 47 to the intake channel 40 and through two check valves 48 and 49 to a suction channel 50 which extends downward into the reservoir 43. These check valves permit liquid to flow from the reservoir 43 to the intake channel 40 but prevent it from flowing in the opposite direction.

The pressure created by the variable displacement pump 7 is limited by a relief valve 51 which is adjusted to open at a high pressure, for instance 1500#, and has its inlet connected by a channel 52 to the discharge channel 37 and its outlet connected to a drain channel 53 which discharges into the reservoir 43.

The pressure created by the gear pump 42 is limited by a relief valve 54 which is adjusted to open at a low pressure, for instance 50#, and has its inlet connected to the intake channel 40 and its outlet connected to the drain channel 53.

The pump 7 may be any one of the several types, but a pump which is particularly suited for the purpose is disclosed in application Serial No. 662,219 filed March 23, 1933 by Walter Ferris. The gear pump 42 is ordinarily incorporated in the pump 7 as substantially a part thereof, but the pump shown in the above application does not have a gear pump incorporated therein. However, the addition of a gear pump to a variable displacement pump is common practice, as shown by Patent No. 1,753,562 issued April 8, 1930 to John P. Ferris.

The pump 7 has its stroke changing element urged toward full stroke position by springs 55 and urged toward zero stroke position by a hydraulic motor 56 which is connected by a channel 57 to an admission port 58 formed in the casing of a stroke control valve 59 intermediate the ends thereof.

The stroke of the pump 7 is varied in accordance with variations in the pressure prevailing in the channel 57, and this pressure is limited by a relief valve 60 which is adjusted to open at a low pressure, for instance 200#, and has its inlet connected to the channel 57 and its outlet connected to the drain channel 53.

The stroke control valve 59 has two ports 61 and 62 formed in its casing upon either side of the port 58 and controlled by a plunger 63 which is fitted in the bore of the casing and has a piston arranged upon each of its ends.

When the pump is being driven at a uniform speed, the pistons of the plunger 63 have the adjacent edges thereof substantially in alinement with the adjacent edges of the ports 61 and 62, and the forces acting upon the ends of the plunger 63 are such that the plunger 63 substantially floats in this position so that a slight variation in the force acting upon one of its ends will destroy the equilibrium of the plunger and cause it to uncover one of the ports and completely cover the other port.

Movement of the plunger 63 in one direction will open the port 62 to the port 58 and permit liquid to flow to the motor 56 to thereby decrease the stroke of the pump, and movement of the plunger 63 in the opposite direction will open the port 61 to the port 58 and permit liquid to escape from the motor 56 to thereby increase the stroke of the pump, the port 61 being connected to the drain channel 53 through a choke 64 which limits the rate at which the motor 56 may move the stroke changing element of the pump 7 and thereby prevents it from hunting.

The plunger 63 is urged toward the left in respect to Fig. 3 by the fluid pressure prevailing in the return channel 41, which has its other end connected to the casing of the valve 59 at the right end thereof, and by a helical compression spring 65 which is arranged within the casing of the valve 59 and has its tension adjusted by a screw 66.

The plunger 63 is urged toward the right by the fluid pressure prevailing in the return channel 67 which is connected at one of its ends to the left end of the valve casing and is connected intermediate its ends through an orifice or choke 68 to the return channel 41 intermediate the ends thereof.

Liquid returned from the hydraulic circuit to the pump 7 flows from the channel 67 to the channel 41 through the orifice 68 which causes a drop in pressure between the channel 67 and the channel 41, and this drop in pressure varies in accordance with variations in the velocity of the liquid.

The orifice 68 is so adjusted or proportioned and the spring 65 is so adjusted that the forces exerted by the liquid and the spring upon the right end of the plunger 63 will just balance the force exerted by the liquid upon the left end of the plunger 63 when the pump is delivering liquid at the correct volumetric rate to the hydraulic motor 6 to cause it to drive the compressor 1 at the correct speed, thereby retaining the valve plunger 63 in its intermediate position and trapping liquid in the motor 56 to hold the stroke changing element of the pump 7 in its adjusted position.

The port 62 in the valve 59 is open at all times to the channel 67 through a duct 69 which extends axially inward from the left end of the plunger 63 and then radially outward through the piston on the right end of the plunger 63 so that, if the car speed increases and causes the pump 7 to deliver liquid at a faster rate and thereby increase the pressure in the channel 67, the liquid in the left end of the valve casing will move the plunger 63 to the right and open the port 62 to the port 58 and permit liquid to flow from the channel 67 to the motor 56 and actuate it to reduce the stroke of the pump until the volume of liquid delivered by the pump is reduced to the correct rate to produce the correct speed of the compressor 1.

The output of the pump 7 and the speed of the compressor 1 are thus maintained at substantially uniform and constant rates at any car speed within a wide range of car speeds.

The pump control mechanism described above is not claimed herein for the reason that it is described and claimed in application Serial No. 677,546 filed June 26, 1933 by James K. Douglas.

The liquid discharged by the pump 7 flows through the discharge channel 37 which has its outer or discharge end connected to an annular port 70 formed in the casing of a valve 71 which controls the delivery of liquid to the heating coil 10.

The port 70 is normally open to an annular port 72 which is arranged at the left of the port 70 and connected by a channel 73 to an annular port 74 formed in the casing of a valve 75 which controls the operation of the hydraulic motor 6.

The port 74 is connected by a channel 76 to the inlet of the hydraulic motor 6 and is normally open to an annular port 77 to which the outer or inlet end of the return channel 67 is connected.

The valve 71 has a annular port 78 formed therein at the right of the port 70 and connected by a pipe 79 to one end of the heating coil 10 the other end of which is connected by a pipe 80 to the return channel 67 intermediate the ends thereof.

The coil 10 may have its passageway sufficiently restricted throughout the length thereof to cause the liquid to be heated when forced therethrough, or a choke 81 may be connected into the pipe 79 to cause the liquid to be heated before entering the coil.

The flow of liquid through the valve 71 is controlled by its plunger 82 which is urged against the left end of the valve casing by a helical compression spring 83 arranged in the right end of the valve casing.

The plunger 82 is adapted to be moved toward the right by liquid supplied through a channel 84 which connects the left end of the valve casing to an annular port 85 formed in the casing of a pilot valve 86 between an admission port 87 and a drain port 88.

The flow of liquid through the pilot valve 86 is controlled by its plunger 89 which normally blocks the port 87 and is urged against the left end of the valve casing by a helical compression spring 90 arranged in the right end of the valve casing. The plunger 89 is adapted to be moved toward the right by a solenoid 91 which has its core connected thereto by a valve stem 92.

The admission port 87 is connected by a channel 93 to the port 77 in the valve 75, and the drain port 88 is connected to a drain channel 94 which is also connected to both ends of the pilot valve casing and to the right end of the casing of the valve 71 to permit the plungers 82 and 89 to be freely moved therein.

The flow of liquid through the valve 75 is controlled by its plunger 95 which controls communication between the port 77 and the port 74 and between a port 77 and the port 96 which is connected by a channel 97 to the outlet of the hydraulic motor 6.

The plunger 95 is urged against the left end of the valve casing by a helical compression spring 98 arranged in the right end of the valve casing, and it is adapted to be urged to the right by liquid supplied through a channel 99 which connects the left end of the valve casing to a port 100 formed in the casing of a pilot valve 101 between an admission port 102 and a drain port 103.

The flow of liquid through the pilot valve 101 is controlled by a plunger 104 which normally blocks the port 102 and is urged against the left end of the valve casing by a helical compression spring 105 arranged in the right end of the valve casing. The plunger 104 is adapted to be moved to the right by a solenoid 106 which has its core connected thereto by a valve stem 107.

The admission port 102 has the channel 93 connected thereto, and the drain port 103 is connected to a drain channel 108 which discharges into the drain channel 53 and is connected to both ends of the pilot valve casing to permit the plunger 104 to move freely therein.

The pilot valve 101 has the drain channel 94 connected to the left end of its casing to permit it to discharge therethrough into the drain channels 108 and 53, and the drain channel 94 is connected by a channel 109 to the right end of the casing of the valve 75 to permit the plunger 95 to move freely therein.

The solenoid 91 has one end of its windings connected by a conductor 110 to one terminal of a switch 111 the other terminal of which is connected by a conductor 112 direct to one terminal of the generator 29 and through a manual switch 113 to one terminal of the battery 28.

The other terminals of the battery 28 and the generator 29 are connected through conductors 114 and 115 to the other end of the winding of the solenoid 91 and to one end of the winding of the solenoid 106 the other end of which is connected to a conductor 116 to one terminal of a switch 117 which has its other terminal connected to the conductor 112.

When the switches 111 and 113 are closed, the solenoid 91 will be energized and move the plunger 89 of the pilot valve 86 to the right to the position shown in Fig. 5. When the switches 117 and 113 are closed, the solenoid 106 will be energized and move the plunger 104 of the pilot valve 101 to the right to the position shown in Fig. 4. The manual switch 113 is normally closed but may be opened to prevent the solenoids 91 and 106 from being energized and thereby prevent the apparatus from either cooling or heating the car, as when the car is empty.

The switches 111 and 117 are operated, respectively, by two thermostats 118 and 119 which are arranged within the car and respond to predetermined degrees of temperature.

When the temperature within the car drops below a predetermined minimum, the thermostat 118 closes the switch 111 and keeps it closed until the temperature within the car rises to a predetermined degree.

When the temperature within the car rises above a predetermined maximum, the thermostat 119 closes the switch 117 and keeps it closed until the temperature within the car drops to a predetermined degree.

The thermostat 119 also operates a switch 120 which controls the flow of current between the electric motor 5 and an external electric circuit which is represented by a flexible twin-conductor 121 having a connector 122 arranged upon the end thereof.

The connector 122 is adapted to be connected to a receptacle 123 which is carried by the car body and connected to one terminal of the motor 5 by a conductor 124 and to one terminal of the switch 120 by a conductor 125. The other terminals of the motor 5 and the switch 120 are connected to each other by a conductor 126. When the connector 122 is inserted in the receptacle 123 and the switch 120 is closed, the motor 5 will be energized and drive the hydraulic motor 6 which will function as a pump and draw liquid through the channel 76 and discharge it into the channel 97. Pressure created by the motor 6 when functioning as a pump is limited by a relief valve 127 which is connected to the channel 97 and discharges into the drain channel 53.

When the electric motor 5 and the pumps 7 and 42 are idle, as when the car is stationary and the motor 5 is not connected to an external electric circuit, the parts assume the positions shown in Fig. 3 with the exception of the plunger 63 of the stroke control valve 59 which is in the position shown in Fig. 6.

Figure 3.

This figure shows the positions assumed by the several parts when the car is running and the temperature of the car is either within the prescribed limits or is not being controlled due to the manual switch 113 being open.

Under either of these conditions, the pump 7 discharges liquid into the discharge channel 37 either through the channel 33 and the check valve 35 or through the channel 34 and the check valve 36, depending upon the direction in which the car is moving.

The liquid flows through the channel 37, the valve 71 via the ports 70 and 72, the channel 73, the valve 75 via the ports 74 and 77 and returns to the pump through the return channel 67, the choke or orifice 68, the return channel 41, the intake channel 40 and either through the check valve 39 and the channel 34 or through the check valve 38 and the channel 33.

As long as the car moves at a slow speed so that the pump 7 is driven at slow speed, the plunger 63 of the valve 59 remains in the position shown in Fig. 6 but, when the car speed increases above a certain minimum and thereby causes a predetermined drop in pressure between the channels 67 and 41, the plunger 63 is moved to the right, as previously explained, and liquid from the channel 67 flows through the duct 69, the ports 62 and 58 and the channel 57 to the motor 56 and operates it to reduce the stroke of the pump to maintain the pump output at a predetermined volumetric rate.

The gear pump 42 draws liquid from the reservoir 43 through the suction channel 50 and through either the check valve 48 and the channel 44 or through the check valve 49 and the channel 45 and discharges it into the intake channel 40 either through the channel 44 and the check valve 46 or through the channel 45 and the check valve 47, depending upon the direction in which the car is moving.

Substantially all of the liquid discharged by the gear pump at this time is exhausted through the relief valve 54 which causes the gear pump to maintain a low pressure in the channel 40 and to tend to deliver liquid through the check valve 38 or the check valve 39 to the intake of the pump 7 to maintain pressure therein and to compensate for leakage losses.

The gear pump also maintains pressure in the return channel 41 which requires the pump 7 to create pressure in the channels 37, 73 and 67, and this pressure extends through the channel 93 to the ports 87 and 102 which are blocked at this time by the plungers 89 and 104, respectively. This pressure also extends through the channel 76 to the hydraulic motor 6 but is insufficient to drive it.

Figure 4.

If the temperature within the car rises above a predetermined maximum, the thermostat 119 closes the switch 117 to energize the solenoid 106 which moves the pilot valve plunger 104 toward the right. The thermostat 119 also closes the switch 120 but this has no effect upon the electric motor 5 since the switch 120 is not connected to an electric circuit at this time.

Moving the pilot valve plunger 104 toward the right blocks the drain port 103 and opens the admission port 102 to the port 100, thereby permitting liquid to flow from the channel 93 through the pilot valve casing and the channel 99 to the left end of the casing of the valve 75 and move its plunger 95 toward the right to close communication between the port 77 and the port 74 and to open communication between the port 77 and the port 96.

Liquid from the pump 7 may now flow through the discharge channel 37, the valve 71, the channel 73, the port 74 in the valve 75 and the channel 76 to the motor 6 and drive it. Liquid discharged from the motor 6 flows through the channel 97, the valve 75 via the ports 96 and 77 into the return channel 67.

The motor 6 drives the compressor 1, and the refrigerating apparatus operates and cools the car until the temperature therein drops below a predetermined degree at which time the thermostat 119 opens the switch 117 to deenergize the solenoid 106 and then the several parts assume the positions shown in Fig. 3.

If the car speed changes during operation of the motor 6, the stroke control apparatus functions to vary the stroke of the pump 7 inversely proportional to the variation in car speed so that the pump 7 delivers liquid at a substantially constant rate and thereby drives the motor 6 to operate the compressor 1 at a speed which remains substantially constant within a wide range of car speeds.

Figure 5.

If the car travels through an area of low outside temperatures so that its internal temperature drops below a predetermined minimum, the thermostat 118 closes the switch 111 to energize the solenoid 91 which moves the pilot valve plunger 89 to the right to block the drain port 88 and open the admission port 87 to the port 85 and permit liquid to flow from the channel 93 through the pilot valve casing and the channel 84 to the left end of the casing of the valve 71 and move its plunger 82 toward the right to close communication between the port 70 and the port 72 and to open communication between the port 70 and the port 78.

Liquid from the pump 7 may now flow through the channel 37 and through the valve 71 via the ports 70 and 78 into the pipe 79 and be forced through the choke 81 and the heating coil 10 to heat the car. Liquid is discharged from the coil 10 through the pipe 80 into the return pipe 67.

The apparatus functions in this manner until the temperature within the car rises to a predetermined degree and then the thermostat 118 opens the switch 111 to deenergize the solenoid 91. The several parts then assume the positions shown in Fig. 3.

Figure 6.

If the car is stationary and the receptacle 123 is connected into an external electric circuit, as by means of the conductor 121 and the connector 122, and if the temperature within the car rises above a predetermined maximum, the thermostat 119 will close the switch 120 to energize the electric motor 5.

The thermostat 119 also closes the switch 117 and thereby energizes the solenoid 106 which moves the pilot valve plunger 104 toward the right but, since there is no pressure at this time in the channel 93, the spring 98 continues to hold the plunger 95 of the valve 75 against the left end of the valve casing.

The electric motor 5 drives the compressor 1, to cause the refrigerating apparatus to cool the car, and at the same time it drives the hydraulic motor 6 which will function as a pump and draw liquid from the reservoir 43 through the path of least resistance which would probably be the channel 50, the check valve 48, the channel 44, the check valve 46, the channel 40, the check valve 39, the channel 34, the check valve 36, the channel 37, the valve 71, the channel 73, the valve 75 and the channel 76. The motor will discharge liquid through the channel 97, the valve 75, the channels 109 and 94, the valve 101 and the channels 108 and 53 into the reservoir 43.

Since these passages are all substantially free, the liquid will circulate freely and but little power be required to drive the motor 6.

The electric motor 5 continues to drive the compressor 1 until the temperature within the car drops below a predetermined degree and then the thermostat 119 opens the switch 120 to deenergize the motor 5. The thermostat 119 also opens the switch 117 to deenergize the solenoid 106 and permit the spring 105 to return the pilot valve plunger 104 to its normal position.

Figures 7 and 8.

The apparatus shown in these figures is the same as the apparatus shown in Figs. 3 to 6 except that it has been modified to permit liquid to be directed from the motor 6 through the heating coil 10 to heat the interior of the car when the car is stationary and the electric motor is driven by power supplied from a stationary electric circuit.

In this form of the apparatus, the channel 109 is connected to a port 130 in the valve 71 instead of being connected to the drain channel 94, the port 96 in the valve 75 is connected through a check valve 131 to the discharge pipe 37, the pipe 80 connects the discharge end of the heating coil 10 to a magnetically operated auxiliary valve 132 instead of connecting it to the return pipe 67, as in Figs. 3 to 6, and the magnetic clutch 32 is connected between the gearing 31 and the compressor 1.

Since there is no fluid pressure available to operate the valve 71 hydraulically when the car is stationary, this valve is operated by a solenoid 133 which has its core connected to the plunger 82 of the valve 71 by a valve stem 134.

The solenoid 133 has one end of its winding connected by a conductor 135 to the conductor 124 and the other end thereof connected by a conductor 136 to one terminal of a switch 137 which is operated by the solenoid 118 and has its other terminal connected to the conductor 125. The thermostat 118 also operates a switch 138 which has one of its terminals connected to the conductor 125 and its other terminal connected by a conductor 139 to the conductor 126.

When the receptacle 123 is connected into an electric circuit and the switches 137 and 138 are closed, the electric motor 5 will be operated and the solenoid 133 will be energized and move the plunger 82 of the valve 71 toward the right.

The channel 80 is connected to the auxiliary valve 132 in communication with a port 140 which is arranged between two ports 141 and 142 formed in the valve casing. The port 141 is connected by a channel 143 to the return channel 67, and the port 142 is connected to a drain channel 144 which discharges into the drain channel 53 and is also connected to both ends of the valve casing.

The flow of liquid through the auxiliary valve 132 is controlled by its plunger 145 which is urged toward the left by a spring 146 and adapted to be moved toward the right by a solenoid 147 which has its core connected thereto by a valve stem 148.

The solenoid 147 has one end of its winding connected to the conductor 135 and the other end thereof connected to the conductor 136 so that, when the solenoid 133 is energized, the solenoid 147 will also be energized and the valve plungers 82 and 145 will be moved toward the right at substantially the same time.

The switch 137 also controls the magnetic clutch 32 which has one of its terminals connected to the conductor 124 by a conductor 149 and its other terminal connected to the conductor 136 by a conductor 150 so that it may be energized in unison with the solenoids 133 and 147.

In order that the motor 6 may draw liquid from the reservoir 43, the return channel 67 is connected intermediate its ends to a suction channel 151 which extends into the reservoir 43 and has a check valve 152 arranged therein to permit liquid to be drawn from the reservoir into the return channel 67 but prevent it from flowing in the opposite direction.

Figure 7.

When the car is stationary, the receptacle 123 connected into an electric circuit and the temperature within the car falls below a predetermined minimum, the thermostat 118 will close the switches 111, 137 and 138.

Closing the switch 111 will cause the solenoid 91 to be energized and move the pilot valve plunger 89 toward the right but, since there is no pressure in the channel 93, this movement of the plunger 89 will have no effect upon the valve plunger 82.

Closing the switch 137 will cause the magnetic clutch 32 to be energized and disconnect the compressor 1 from the gearing 31 and also cause the solenoids 133 and 147 to be energized and move the valve plungers 82 and 145 toward the right to the positions shown.

Closing the switch 138 will cause the electric motor 5 to be energized and drive the hydraulic motor 6 which will function as a pump, the compressor 1 remaining idle due to the clutch 32 being disengaged.

The motor 6 will draw liquid from the reservoir 43 through the channels 151 and 67, the valve 75 and the channel 76 and discharge it through the channel 97, the port 96 in the valve 75, the check valve 131, the outer end of the channel 37, the valve 71, the pipe 79 and the choke 81 into the coil 10 to heat the car. The liquid discharged from the coil 10 will flow through the pipe 80, the valve 132 and the channels 144 and 53 to the reservoir 43.

Pressure created by the motor 6 extends throughout the length of the channel 37 but the liquid is prevented from escaping from the inner end thereof by the check valves 35 and 36 and by the relief valve 51. Pressure also extends through the right end of the valve 75 to the channel 109 but the liquid is prevented from escaping therefrom by the valve plunger 82 which at this time blocks the port 130 in the valve 71.

When the temperature within the car reaches a predetermined degree, the thermostat 118 will open the switches 111, 137 and 138 to permit the valve springs to return the valve plungers 82 and 89 to their normal positions, as shown in Fig. 3, and the spring 146 to return the valve plunger 145 to its normal position as shown in Fig. 8.

Figure 8.

This figure shows the modified apparatus with the several parts thereof in the positions occupied when the car is in motion and its interior is being heated.

The switches 111, 137 and 138 are closed but the electric motor 5 and the solenoids 133 and 147 are not energized due to the fact that the receptacle 123 is not connected into an external electric circuit.

Closing the switch 111, however, causes the solenoid 91 to be energized and move the plunger 89 of the pilot valve 86 toward the right to open the port 87 to the port 85 as in Fig. 5.

Since the pumps 7 and 42 are being driven from the car axle and creating pressure in the channel 93, liquid flows through the pilot valve 86 and the channel 84 to the left end of the valve 71 and moves its plunger 82 toward the right to open the port 70 to the port 78 and to block the ports 72 and 130.

The liquid discharged by the pump 7 into the channel 37 flows through the valve 71, the pipe 79 and the choke 81 into the coil 10 to heat the car, and liquid discharged from the coil 10 flows through the channel 80, the ports 140 and 141 in the valve 132, the channels 143 and 67 and the orifice 68 to the return channel 41.

When the temperature of the car reaches a predetermined degree, the thermostat 118 opens the switch 111 to deenergize the solenoid 91 and permit the valve plungers 89 and 82 to be returned to the positions shown in Fig. 3. The output of the pump 7 is then bypassed as in that figure.

Since the auxiliary valve 132 is employed solely for directing liquid from the discharge end of the coil 10 to either the reservoir 43 or to the intake the pump 7, the apparatus shown in Figs. 7 and 8 functions to cool the car in exactly the same manner as the apparatus shown in Figs. 3 to 6.

The invention herein set forth is susceptible of various modifications and adaptations without departing from the scope thereof as hereafter claimed.

The invention is hereby claimed as follows:

1. The combination, with a vehicle and apparatus carried by said vehicle, of a pump driven by motion imparted thereto from said vehicle, a hydraulic motor driven by liquid supplied thereto by said pump for driving said apparatus, fluid channels connecting said pump and said motor and forming therewith a hydraulic circuit, and means responsive to a drop in pressure between two parts of said circuit for maintaining the speed of said motor substantially constant within a wide range of speeds of said vehicle to thereby operate said apparatus at a substantially constant speed at any vehicle speed within said range.

2. The combination, with a vehicle and apparatus carried by said vehicle, of a variable displacement pump driven by motion imparted thereto from said vehicle, a hydraulic motor driven by liquid supplied thereto by said pump for driving said apparatus, and fluid actuated means responsive to variations in the velocity of the liquid circulated by said pump for varying pump displacement inversely to said variations in velocity to thereby enable said motor to operate said apparatus at a substantially constant speed at any vehicle speed within a wide range of vehicle speeds.

3. The combination, with a wheeled vehicle and apparatus carried by said vehicle, of a hydraulic motor for driving said apparatus, a pump for supplying liquid to said motor to drive the same, a drive connecting said pump to a wheel of said vehicle for driving said pump from said wheel, fluid channels connecting said pump and said motor and forming therewith a hydraulic circuit, and means responsive to a drop in pressure between two parts of said circuit for varying the ratio between the displacements of said pump and said motor in accordance with variations in the speed of said wheel to thereby enable said motor to drive said apparatus at a substantially constant speed at any wheel speed within a wide range of wheel speeds.

4. The combination, with a wheeled vehicle and apparatus carried by said vehicle, of a hydraulic motor for driving said apparatus, a variable displacement pump for supplying liquid to said motor to drive the same, a drive connecting said pump to a wheel of said vehicle for driving said pump from said wheel, fluid channels connecting said pump and said motor and forming therewith a hydraulic circuit, and means responsive to a drop in pressure between two parts of said circuit for varying pump displacement inversely to variations in the speed of said wheel to thereby enable said motor to drive said apparatus at a substantially constant speed at any wheel speed within wide range of wheel speeds.

5. The combination, with a wheeled vehicle and apparatus carried by said vehicle, of a hydraulic motor for driving said apparatus, a pump for supplying liquid to said motor to drive the same, a drive connecting said pump to a wheel of said vehicle for driving said pump from said wheel, and fluid actuated means responsive to variations in the velocity of the liquid circulated by said pump for varying the ratio between the displacements of said pump and said motor in accordance with variations in the speed of said wheel to thereby enable said motor to drive said apparatus at a substantially constant speed at any wheel speed within a wide range of wheel speeds.

6. The combination with a wheeled vehicle and air conditioning apparatus carried by said vehicle, of a hydraulic motor for driving said apparatus, a pump driven from the wheel of said vehicle and delivering liquid in either of two opposite directions in accordance with the direction of rotation of said wheel, means for directing liquid from said pump to said motor to drive the same in a given direction irrespective of the direction of pump delivery, and means for varying the ratio between the displacements of said pump and said motor in accordance with variations in the speed of said wheel to thereby enable said motor to drive said apparatus at a substantially constant speed at any wheel speed within a wide range of wheel speeds.

7. The combination with a wheeled vehicle and air conditioning apparatus carried by said vehicle, of a hydraulic motor for driving said apparatus, a variable displacement pump driven from a wheel of said vehicle and delivering liquid in either of two opposite directions in accordance with the direction of rotation of said wheel, means for directing liquid from said pump to said motor to drive the same in a given direction irrespective of the direction of pump delivery, and means for varying pump displacement inversely to variations in the speed of said wheel to thereby enable said motor to drive said apparatus at a substantially constant speed at any wheel speed within a wide range of wheel speeds.

8. The combination with a wheeled vehicle and air conditioning apparatus carried by said vehicle, of a hydraulic motor for driving said apparatus, a variable displacement pump driven from a wheel of said vehicle and delivering liquid in either of two opposite directions in accordance with the direction of rotation of said wheel, means for directing liquid from said pump to said motor to drive the same in a given direction irrespective of the direction of pump delivery, and means responsive to variations in the velocity of the liquid circulated by said pump for varying pump displacement inversely to variations in the speed of said wheel to thereby enable said motor to drive said apparatus at a substantially constant speed at any wheel speed within a wide range of wheel speeds.

9. The combination, with a vehicle and air conditioning apparatus carried by said vehicle for cooling the interior thereof, a hydraulic motor for driving said apparatus, a heating coil carried by said vehicle to cause liquid forced therethrough to heat the interior of said vehicle, a pump driven by motion imparted thereto from said vehicle for delivering liquid to said motor and said coil selectively, an electric motor for driving said hydraulic motor to cause it to function as a pump, means for connecting said motor into a stationary electric circuit when said vehicle is stationary, and fluid connections for enabling said hydraulic motor to circulate liquid through said coil upon being driven by said electric motor.

10. The combination, with a vehicle and air conditioning apparatus carried by said vehicle for cooling the interior thereof, a hydraulic motor for driving said apparatus, a heating coil carried by said vehicle to cause liquid forced therethrough to heat the interior of said vehicle, a pump driven by motion imparted thereto from said vehicle for delivering liquid to said motor and said coil selectively, an electric motor for driving said hydraulic motor to cause it to function as a pump, means for connecting said motor into a stationary electric circuit when said vehicle is stationary, fluid connections for enabling said hydraulic motor to circulate liquid through said coil upon being driven by said electric motor, means for diverting from said coil the liquid circulated by said hydraulic motor, and means for connecting said electric motor to said apparatus to drive the same.

11. The combination, with a vehicle and refrigerating apparatus carried by said vehicle, of a hydraulic motor for driving said apparatus, a pump driven by motion imparted thereto from said vehicle for supplying liquid to said motor to drive the same, a hydraulically operated valve for controlling the delivery of liquid to said motor, a pilot valve for controlling operation of said hydraulically operated valve, and means responsive to variations in the temperature within said vehicle for operating said pilot valve.

12. The combination, with a vehicle and refrigerating apparatus carried by said vehicle, of a hydraulic motor for driving said apparatus, a pump driven by motion imparted thereto from said vehicle for supplying liquid to said motor to drive the same, a hydraulically operated valve for directing liquid from the discharge side of said pump either to said motor or to the return side of said pump, a pilot valve for controlling operation of said hydraulically operated valve, and means responsive to variations in the temperature within said vehicle for operating said pilot valve.

13. The combination, with a vehicle and refrigerating apparatus carried by said vehicle, of a hydraulic motor for driving said apparatus, a pump driven by motion imparted thereto from said vehicle for supplying liquid to said motor to drive the same, a hydraulically operated valve for controlling the delivery of liquid to said motor, means including an auxiliary pump driven by motion imparted thereto from said vehicle for delivering liquid to said hydraulically operated valve to operate the same, a pilot valve for controlling said delivery to thereby control operation of said hydraulically operated valve, and means responsive to variations in the temperature within said vehicle for operating said pilot valve.

14. The combination, with a vehicle and refrigerating apparatus carried by said vehicle, of a hydraulic motor for driving said apparatus, a pump driven by motion imparted thereto from said vehicle for supplying liquid to said motor to drive the same, a hydraulically operated valve for directing liquid from the discharge side of said pump either to said motor or to the return side of said pump, means including an auxiliary pump driven by motion imparted thereto from said vehicle for delivering liquid to said hydraulically operated valve to operate the same, a pilot valve for controlling said delivery to thereby control operation of said hydraulically operated valve, and means responsive to variations in the temperature within said vehicle for operating said pilot valve.

WALTER FERRIS.
JAMES K. DOUGLAS.
GEORGE H. FOBIAN.